Dec. 29, 1964  M. A. SCHWEIKER  3,162,937
TILE ASSEMBLING APPARATUS
Filed Dec. 20, 1962  7 Sheets-Sheet 2
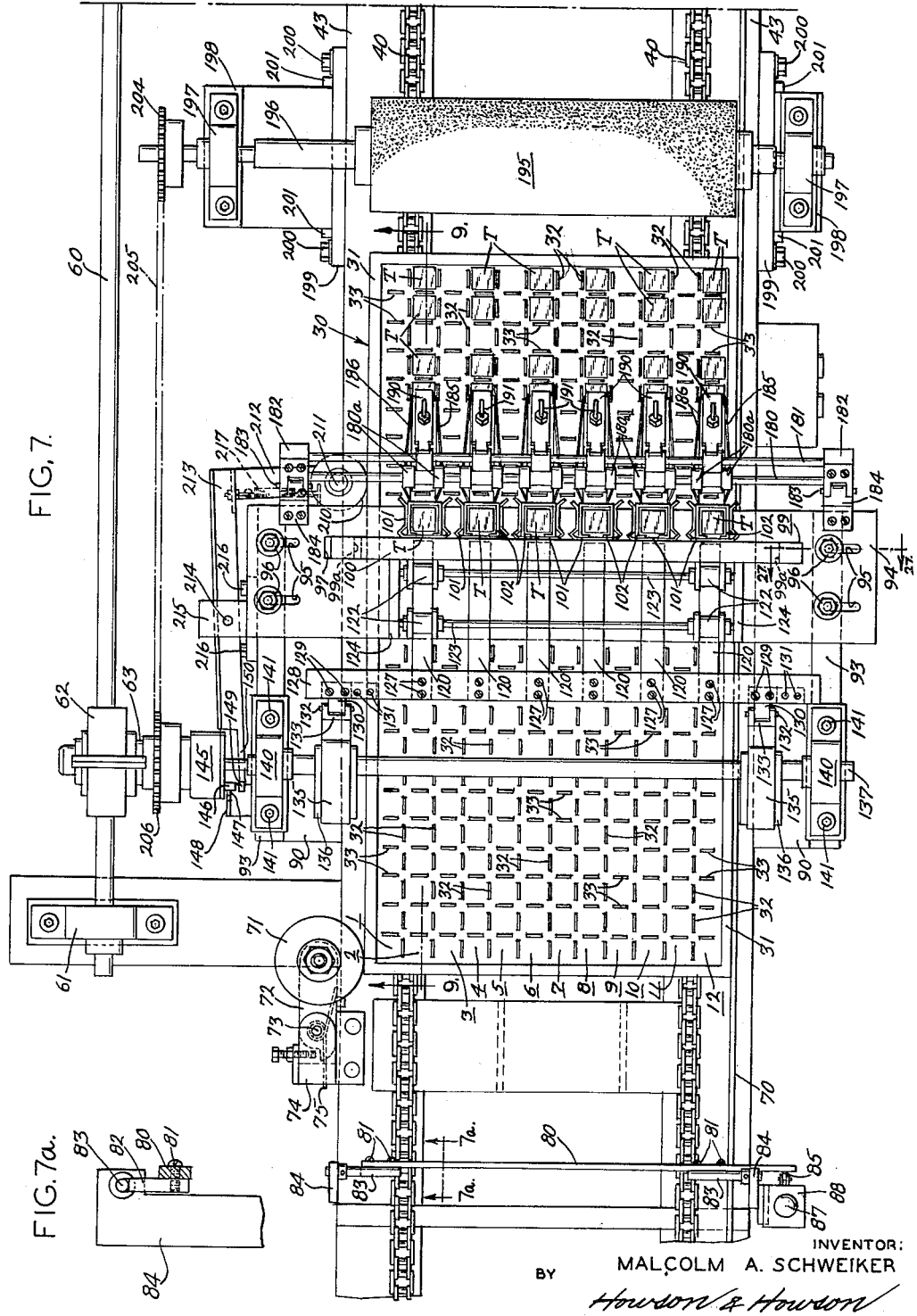
INVENTOR:
MALCOLM A. SCHWEIKER
BY Howson & Howson
ATTYS.

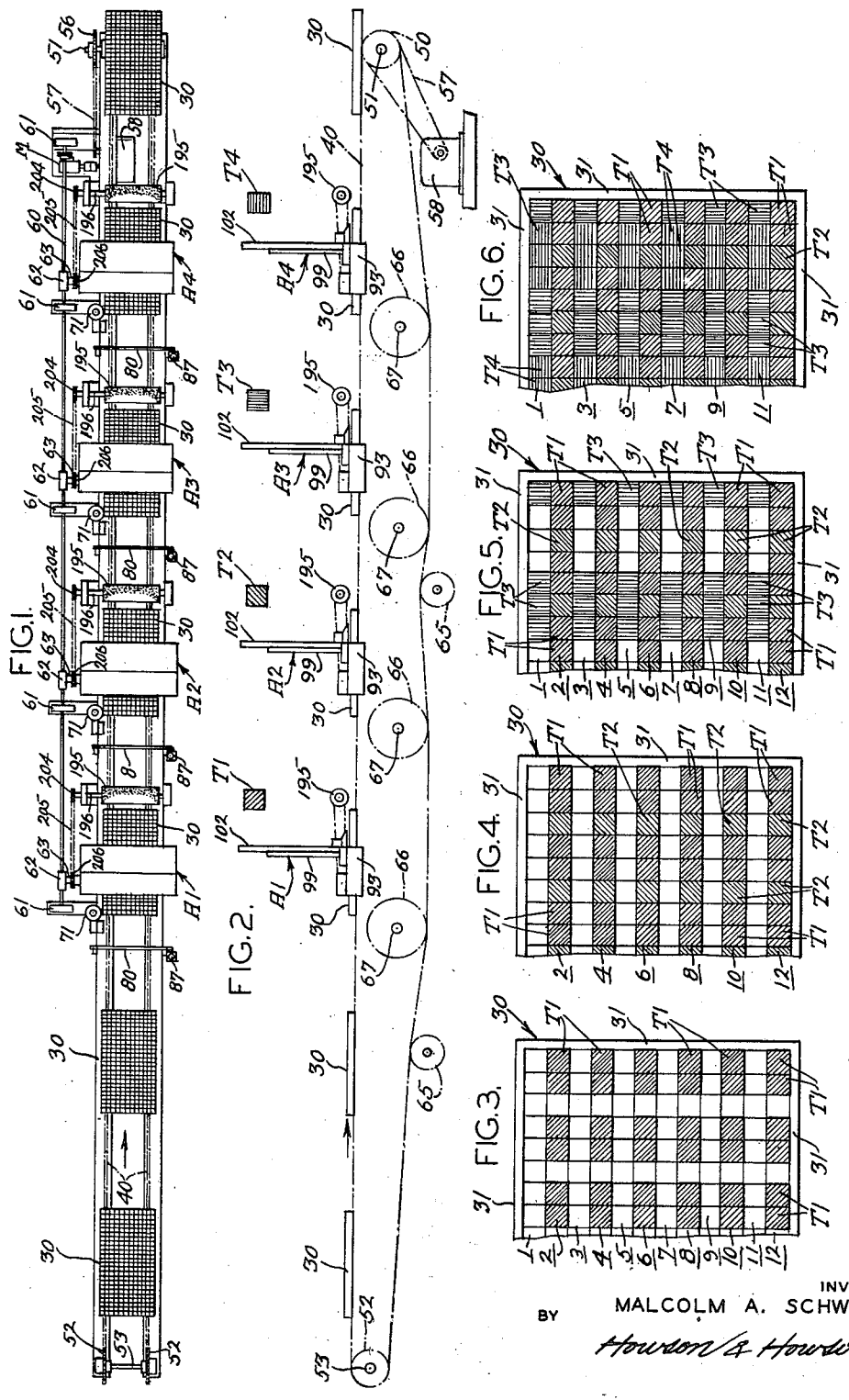

Dec. 29, 1964    M. A. SCHWEIKER    3,162,937
TILE ASSEMBLING APPARATUS
Filed Dec. 20, 1962    7 Sheets-Sheet 3
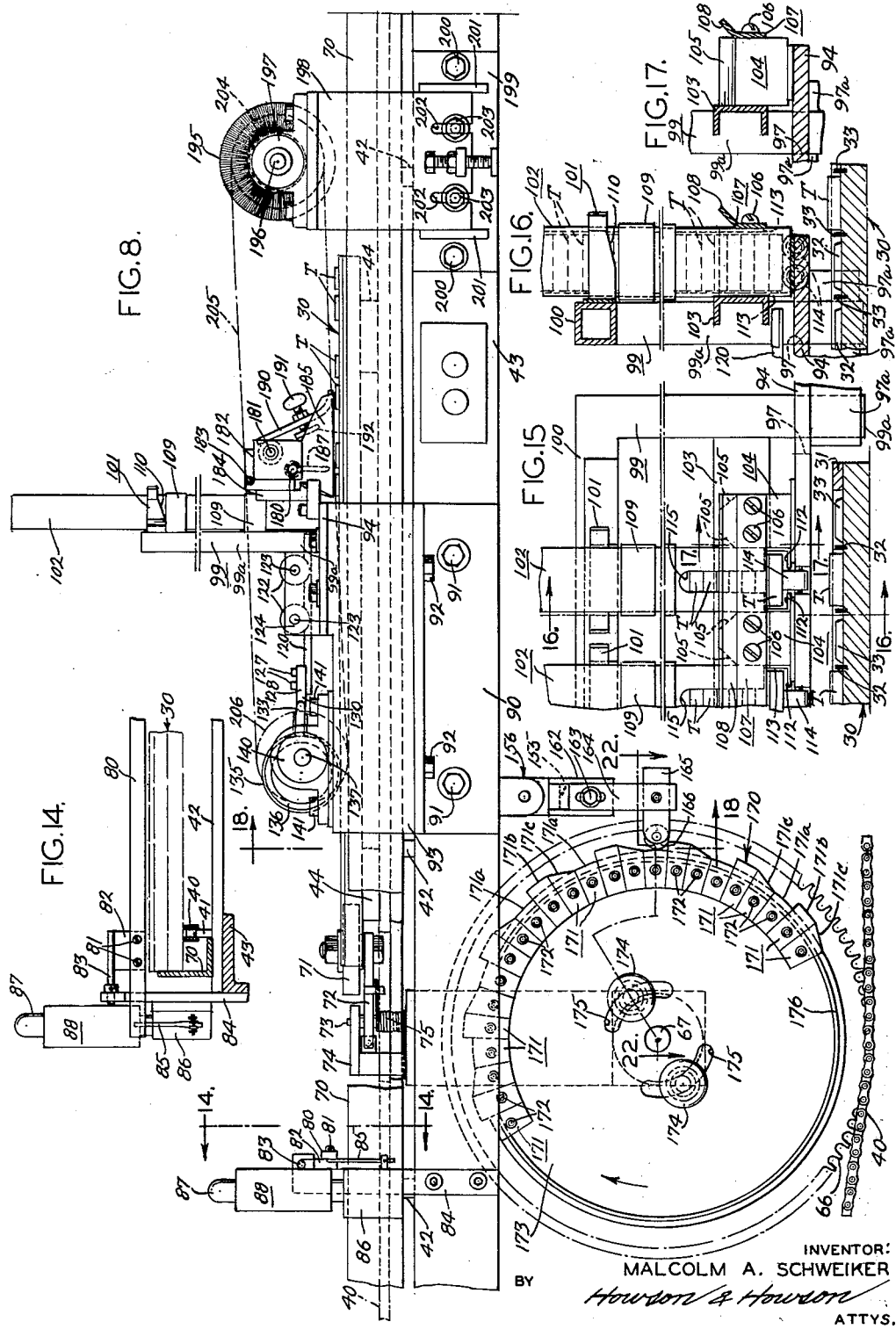
INVENTOR:
MALCOLM A. SCHWEIKER
BY Howson & Howson
ATTYS.

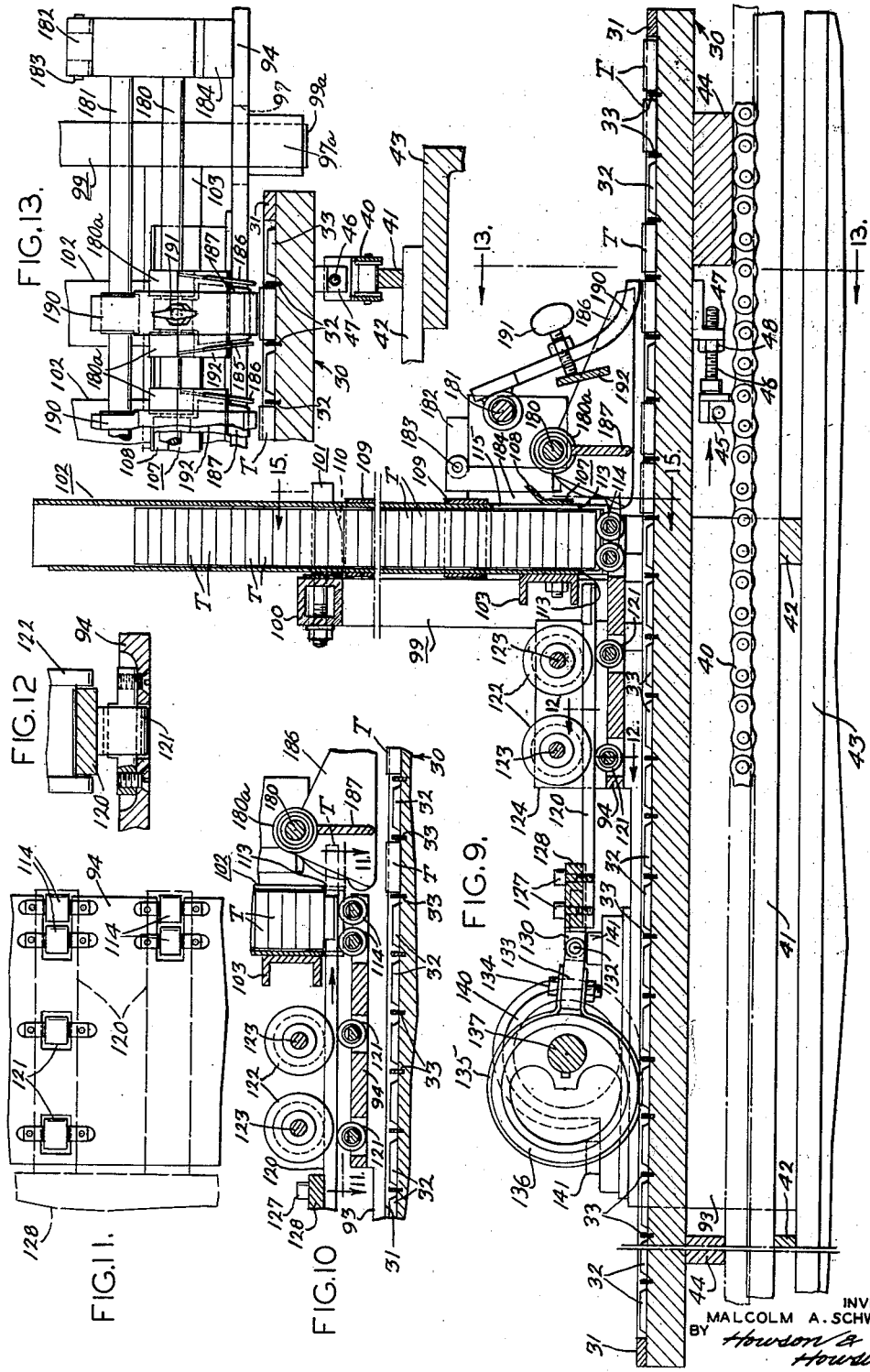

Dec. 29, 1964 M. A. SCHWEIKER 3,162,937
TILE ASSEMBLING APPARATUS
Filed Dec. 20, 1962 7 Sheets-Sheet 5
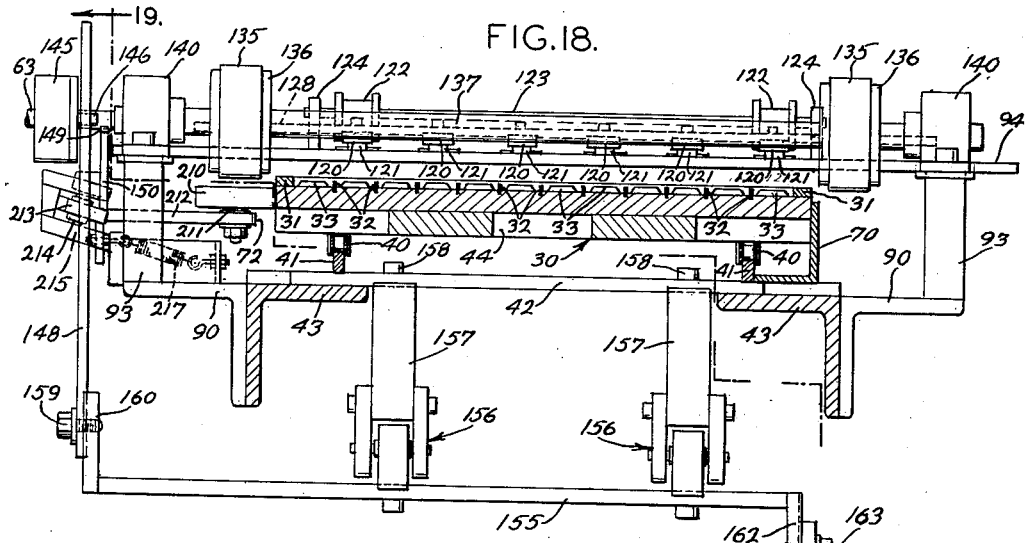
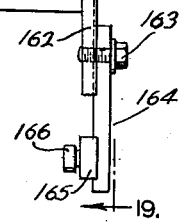
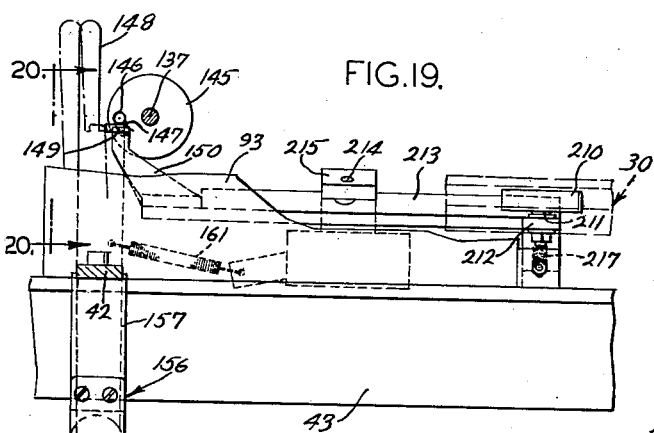
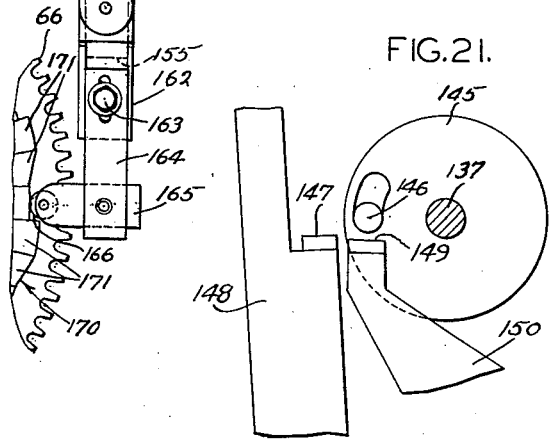
INVENTOR:
MALCOLM A. SCHWEIKER
BY Howson & Howson
ATTYS.

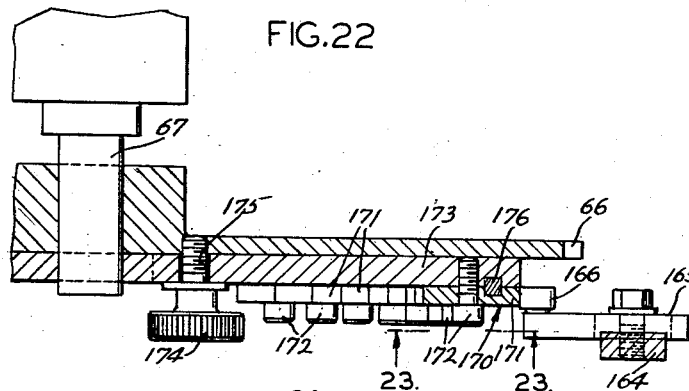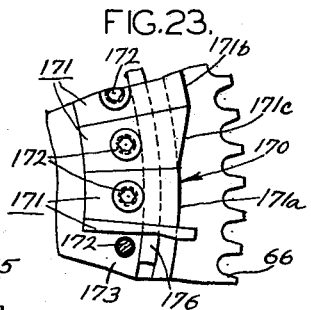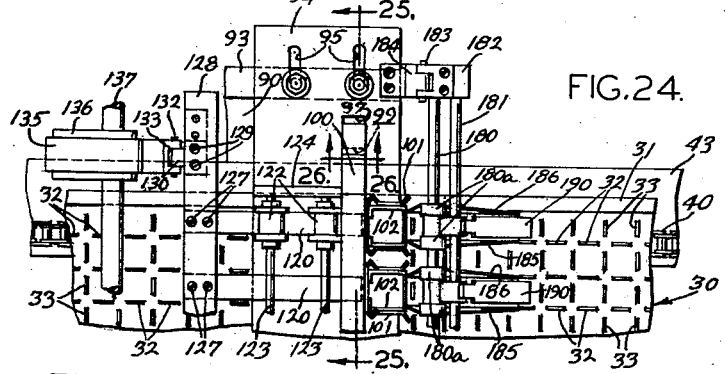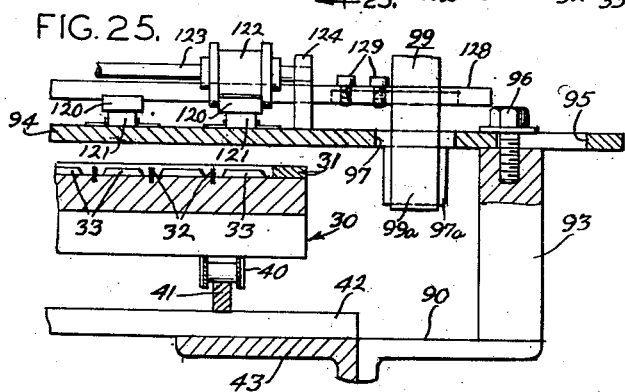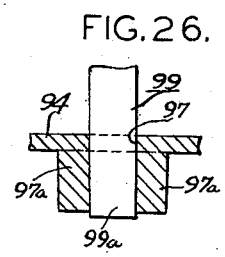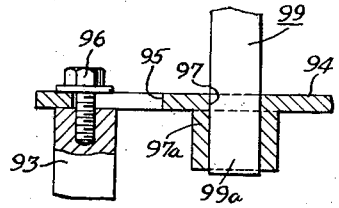

Dec. 29, 1964 M. A. SCHWEIKER 3,162,937
TILE ASSEMBLING APPARATUS
Filed Dec. 20, 1962 7 Sheets-Sheet 7
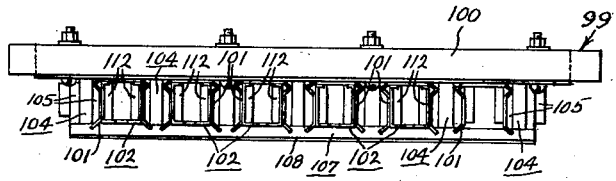
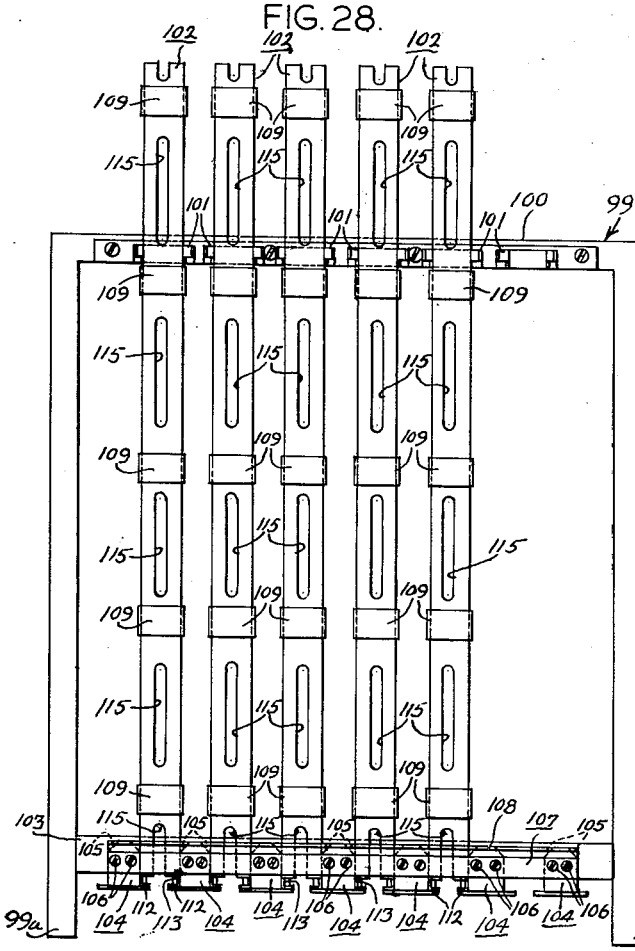
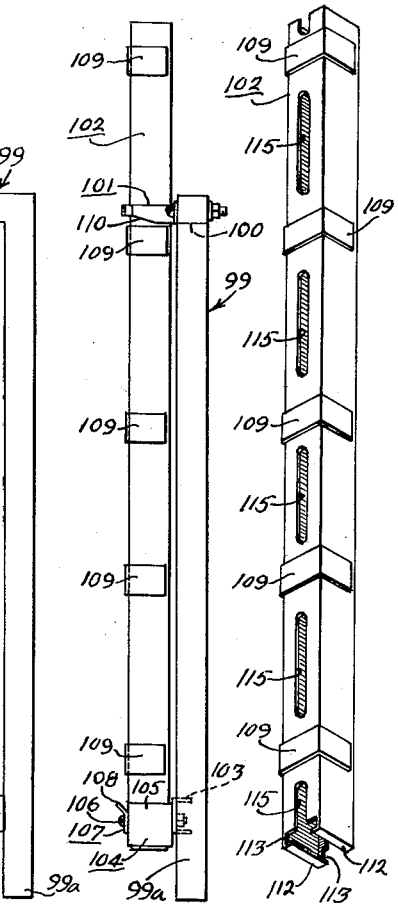
INVENTOR:
MALCOLM A. SCHWEIKER
BY
ATTYS.

United States Patent Office 3,162,937
Patented Dec. 29, 1964

3,162,937
TILE ASSEMBLING APPARATUS
Malcolm A. Schweiker, Worcester, Pa., assignor to American Encaustic Tiling Company, Inc., Lansdale, Pa., a corporation of New York
Filed Dec. 20, 1962, Ser. No. 246,081
12 Claims. (Cl. 29—211)

This invention relates to tile assembling apparatus for setting tiles in predetermined selected patterns in the pockets of continuously moving partitioned pattern boards or trays ready for the application of a backing sheet of paper for making self-contained units for setting in cement. As is known, sheets of tiles with a backing sheet, as of paper, holding them in position with spaces between them to receive grouting, are set in cement; then the paper backing is soaked and removed and the spaces between tiles filled with cement grouting. This general packaging and setting procedure has been in use for a great many years.

The present invention provides improved means for assembling tiles in various patterns upon continuously advancing partitioned pattern boards.

In my copending application Serial No. 225,578, filed September 24, 1962, I have disclosed apparatus for feeding tiles which are all alike or which are in completely random and unpredetermined arrangement and assembling or setting the tiles in all spaces of all rows of continuously advancing pattern boards.

The present invention provides means for assembling or setting a plurality of different types of tiles in selected predetermined arrangements on continuously advancing pattern boards. The tiles are taken from a plurality of stacks of like tiles at each of a plurality of stations or units and the desired number and arrangement of each of several types of tiles is laid at the several stations until all the spaces are filled.

Because of the transverse space required for the dispensing means for feeding tiles from stacks, it is not convenient to feed tiles to all transverse rows at once, as was possible with the apparatus of my copending application, so the present invention provides for the feed of tiles to alternate longitudinal rows at any given point, station or unit, the tiles for the other alternate rows being fed at another point, station or unit. As many tiles as desired can be fed to the longitudinal rows at any given point, station or unit and the spaces left are filled at a succeeding station or stations.

The mechanisms at the stations or units are so made that the feed can be shifted from one set of alternate longitudinal rows (odd or even rows) to another set as may be required for the particular mosaic design selected.

Also the mechanism at each station is such that settings can readily be made for skip-feeding tiles to such selected transverse rows as may be desired.

The general arrangement of the apparatus is such that as many units as desired can readily be set up in a line, the only change required in adding a unit being to lengthen the drive shaft to drive the added unit and to lengthen the conveyor belt which transports the pattern boards to serve the added unit.

Specifically, the present invention provides insertable and shiftable cam means for controlling the tile feed operating means at a unit.

It also provides means for detecting any upstanding obstruction in any board or a raised position of a board as it moves toward a tile feeding station, together with means for shutting down operation if such an obstruction is encountered.

It also provides means for quickly exchanging one magazine or for exchanging a frame carrying a plurality of magazines, as required.

It also provides means for quickly exchanging a tile feed push bar or for exchanging a plurality of push bars, as desired.

The objects of the invention as well as certain features of novelty and advantages will be apparent from the following description of an exemplary embodiment, reference being made to the accompanying drawings, wherein:

FIG. 1 is a plan view of an assembly line which includes four tile feeding units at four stations along the path of a continuously moving board or tray conveying unit;

FIG. 2 is a somewhat schematic side elevation of the apparatus shown in FIG. 1;

FIG. 3 shows a portion of an exemplary pattern of tiles fed by a first unit;

FIG. 4 shows a portion of an exemplary pattern of tiles fed by a second unit;

FIG. 5 shows a portion of an exemplary pattern of tiles fed by a third unit;

FIG. 6 shows a portion of an exemplary pattern of tiles fed by a fourth unit;

FIG. 7 is an enlarged plan view of the mechanism at one feeding station, the one selected being the first one in the line which feeds the tiles to form the pattern of FIG. 3;

FIG. 7a is a fragmentary elevation and section to show part of the board all-clear or board-missing safety mechanism which is provided in advance of each unit, the view being taken on the line 7a—7a of FIG. 7;

FIG. 8 is a partial side elevation of the mechanism shown in FIG. 7;

FIG. 9 is a longitudinal elevation and section taken on the line 9—9 of FIG. 7;

FIG. 10 is a partial section like FIG. 9 but showing the parts in a different stage of operation;

FIG. 11 is a partial plan view taken on the line 11—11 of FIG. 10;

FIG. 12 is a fragmentary vertical transverse section taken on the line 12—12 of FIG. 9;

FIG. 13 is a fragmentary vertical transverse section and elevation taken on the line 13—13 of FIG. 9;

FIG. 14 is a partial vertical transverse section and elevation taken on the line 14—14 of FIG. 8;

FIG. 15 is a partial vertical transverse section and elevation taken on the line 15—15 of FIG. 9;

FIG. 16 is a partial vertical longitudinal section and elevation taken on the line 16—16 of FIG. 15;

FIG. 17 is a partial vertical longitudinal section taken on the line 17—17 of FIG. 15;

FIG. 18 is a transverse vertical section taken on the line 18—18 of FIG. 8;

FIG. 19 is a vertical longitudinal section taken on the line 19—19 of FIG. 18;

FIG. 20 is an enlarged side elevation taken on the line 20—20 of FIG. 19;

FIG. 21 is a side elevation and section taken on the line 21—21 of FIG. 20;

FIG. 22 is an enlarged section taken on the line 22—22 of FIG. 8;

FIG. 23 is a partial side elevation taken on the line 23—23 of FIG. 22;

FIG. 24 is a partial top plan view like FIG. 7 but showing the tile feed mechanism in a shifted position to feed tiles to alternate longitudinal rows from those supplied by tiles in the FIG. 7 setting;

FIG. 25 is a partial enlarged vertical transverse section taken on the line 25—25 of FIG. 24;

FIG. 26 is a fragmentary vertical longitudinal section taken on the line 26—26 of FIG. 24;

FIG. 27 is an enlarged partial vertical transverse section taken on the line 27—27 of FIG. 7;

FIG. 28 is a front elevation of a magazine-carrying frame showing several magazines in position thereon;

FIG. 29 is a top plan view of the parts shown in FIG. 28;

FIG. 30 is a side elevation of parts in FIG. 28 as viewed from the right-hand side; and FIG. 31 is a front perspective view of a magazine.

In order to provide a specific concrete example of the mechanisms and operations to be considered herein, let it be assumed that the boards or trays 30 which are to have a mosaic of tiles T assembled thereon have side rails 31, longitudinal partition fins 32 and transverse partition fins 33 defining twelve (12) longitudinal rows and twenty-four (24) transverse rows which will hold two hundred and eighty-eight (288) tiles arranged in a predetermined mosaic pattern.

Referring to FIGS. 2 to 6, assume that four types of tiles T1, T2, T3 and T4 are to be arranged in the pattern illustrated. When tile types are referred to this comprehends colors, designs, finish or other characteristics known in the tile art which call forth the desire to create mosaic design and make it desirable to assemble different lots or batches of tiles at different stages of assembly. According to the present invention a different assembly unit A1, A2, A3, A4, etc. is provided for each lot of tiles dealt with and this would include a different lot of the same color, design, etc. if handled by a different assembly unit.

The boards or trays 30 are moved along continuously by a pair of belts or chains 40 which, as best shown in FIG. 18, are supported and guided by longitudinal rails 41 carried by transverse frame members 42 which, in turn, are supported on heavy angle frame beams 43 of a supporting frame.

As shown in FIG. 9, the boards or trays are provided with transverse bars 44 which rest on the chains and at fixed intervals along their length the chains carry upstanding pusher brackets 45 which are adapted to engage behind the ends of adjustable studs 46 carried by anchor fittings 47 secured beneath the boards to move the boards along. Locknuts 48 hold the studs 46 in adjusted position.

The empty boards or trays 30 are put on the chains at one end of the span and the filled boards are taken off the chains at the other end of the span.

As shown in FIGS. 1 and 2, the chain span is defined by drive sprockets 50 on a drive shaft 51 at one end and by idler sprockets 52 on a shaft 53 at the other end. If there are more or less assembly units A1, etc. the chain span will be correspondingly longer or shorter. The shaft 51 carries a sprocket 56 which is driven by a chain 57 from a gear unit 58 which is driven by a motor M.

By means not specifically shown, the gear unit 58 drives a longitudinal shaft 60 supported at intervals in bearings 61 and connected at each assembly unit, as by a worm drive 62, to a transverse drive shaft 63. The longitudinal shaft is provided in unit lengths corresponding to the number of assembly units installed.

The lower run of the chains 40 passes over supporting sprockets 65 and at each assembly unit is drivingly engaged with a drive sprocket 66 of a cam shaft 67. The drive is needed only at one side of the machine so, as shown, only one of the chains is provided with sprockets 66.

Since the chain 40 and the shaft 60 are geared to move in a fixed time relationship, the unit drive shafts 63 and the cam drive shafts 67 will be driven in a fixed time relationship.

At one side, as shown in FIGS. 7 and 18, the main frame is provided with an upstanding longitudinal guide rail 70 against which one side of the boards or trays 30 rides as they are carried forward by the chains; and at intervals on the other side (FIGS. 7 and 8), there are provided biasing rollers 71 which urge the boards over against the guide rail 70. The rollers 71 are mounted on arms 72 pivoted on pins 73 carried by brackets 74 secured to the main frame, and the arms 72 are urged inward by springs 75. FIG. 18 does not show the side-biasing roller 71 but shows another roller to be described later which occupies the same lateral position relative to a board or tray.

Means are provided in advance of each assembly unit or station for assuring that the boards are properly seated on the chains and for assuring that there are no upstanding fins, tiles or other obstructions on the boards which might interfere with the proper passage of boards through the assembly unit and the proper reception of tiles at the unit. For this purpose (FIGS. 7, 7a and 8) forward of each station there is provided a transverse bar 80 which occupies a position closely over the top of a passing board. The bar at its end is secured, as by screws 81, to depending arms 82 mounted on pivot pins 83 carried by upstanding brackets 84 secured to the sides of the main frame.

At one side (FIGS. 7, 8 and 14) the swinging bar assembly has associated therewith a switch operating arm 85 for a switch 86. When an obstruction strikes the bar 80 and swings it forward the switch is actuated to light a warning lamp 87 and halt operations until the attendant clears the obstruction. A box 88 for the control mechanism, such as a relay or the like, is shown but the inter-controls will be understood without further description or illustration.

At each station or unit, means are provided for supplying tiles and for feeding tiles into the pockets of half of the longitudinal rows of boards, the means being arranged for selectively feeding either alternate group of half the total number of longitudinal rows. That is, if one unit feeds tiles to one group of rows 1, 3, 5, 7, 9 and 11, another unit will feed tiles to the group of rows 2, 4, 6, 8, 10 and 12, and any unit can be set up to feed tiles to either group of longitudinal rows.

For supporting this tile supply and feeding mechanism, the main frame at each side (FIGS. 7 and 8) is provided with substantial angle support brackets 90 secured by bolts or cap screws 91, the brackets 90 having secured thereon, as by cap screws 92, spacer bars 93.

Near the forward end of the spacer bars 93 there is secured a bridge support plate 94, the support plate having elongated transverse slots 95 adapted to receive cap bolts 96 which clamp the support plate to the spacer bars. The slots are long enough to allow the support plate to be shifted to feed tiles to either alternate group of longitudinal rows.

An upstanding arch support 99, comprising part of a removable magazine holding frame, has its depending legs 99a inserted in holes 97 (FIGS. 26, 27) of the support plate 94; and the upper transverse bar 100 of the support has secured thereto a plurality of spring clips 101 for holding replaceable tubes 102 carrying stacks of tiles T of the desired type. At a lower level a transverse bar 103 is secured, as by welding, to the legs of the arch support. Between the feed tubes 102 there are secured to the bar 103 a plurality of spacer blocks 104 having inwardly sloping surfaces 105 to guide the tubes; and to the front of these spacer blocks 104 there is secured, as by screws 106 a retaining bar 107 having an inclined top flange 108 for guiding the tubes.

The tile feed tubes 102 carry sleeves or bands 109, one of which for each tube slides by lateral movement beneath the cam surfaces 110 of the spring clips 101 (FIGS. 16 and 30) to hold the tubes down in proper position.

As shown in FIGS. 15, 16, 28 and 31, the tubes 102 at the bottom end have inturned flanges 112 for supporting tiles and are provided with front and rear bottom openings 113 for the out-feed of tiles from the bottom of the stack. Rollers 114 carried by the plate 94 at gaps therein support the stacks of tiles when they are being dispensed. Slots 115 are provided in the tubes 102 for observation of tiles therein.

FIGS. 28 to 30 show a magazine holding frame 99 removed from the machine operating assembly. From this it can be seen that when the magazines of a frame are empty it can be removed by pulling the legs 99a out of their holes. Then a new frame with filled magazines can be inserted in its place. The holes have reinforcing lugs 97a beneath the plate 94 to give stability to the frame when the legs are inserted in the holes. One of the holes 97 closely fits a leg; the other may have side clearance for easy insertion. It has a close fit fore and aft.

Tiles are dispensed one-by-one from the stacks by pusher bars or fingers 120 (FIGS. 9–12) which are supported by rollers 121 carried by the transverse plate 94 and at least some of the pusher bars 120 are guided (FIG. 7) by top-riding flanged rollers 122 fast on shafts 123 turnably mounted at their ends in bearings in vertical support plates 124 secured to the plate 94.

The pusher bars 120 are rigidly secured, as by screws 127, to a transverse pusher plate 128, the pusher plate being secured at each end, as by screws 129, to an operating plate 130, there being holes 131 in the transverse plate 128 for securement at selected positions for feeding different tiles to different groups of alternate longitudinal rows.

The plates 130 are operatively connected, as by pivot pins 132 to operating eccentric plates 133 which are secured (FIG. 9) as by bolts 134, to eccentric straps 135 mounted on eccentrics 136 secured on a transverse operating shaft 137.

It will be seen that by removing the screws 127 the push bars 120 can readily be removed; and by removing the screws 129 the whole group of push bars along with the plate 128 on which they are mounted can be removed.

As shown in FIG. 7, the shaft 137 is mounted in bearings 140 which, as shown in FIG. 8, are secured by screws 141 to the angle support brackets 90.

The shaft 137 is selectively driven by a one-revolution clutch 145 from the power shaft 63 previously mentioned, and the clutch 145 is controlled by a projecting pin 146 (FIGS. 19–21). When the pin 146 is held against rotation, either by a pattern selecting abutment 147 of an arm 148 or by the no-board safety abutment 149 of an arm 150, the shaft 137 will not be operated and no tiles will be fed. The abutment 147 moves under the pin 146 by movement transversely of the axis of shaft 137 and the abutment 149 moves under the pin by axial and inclined upward movement.

The arm 148 is operated from a selector cam on the opposite side of the machine so, as shown in FIG. 18, a cross-over operating connection is provided. This connection includes a transverse bar 155 supported by swing linkage, generally designated by the numeral 156, from depending brackets 157 which are secured, as by screws 158, from a transverse member of the main frame. The arm 148 is secured, as by slots and a screw 159, to an upwardly bent arm 160 of the transverse bar 155. A spring 161 urges the arm 148 toward the pin 146.

At its other end the bar 155 has a downwardly bent arm 162 (FIGS. 19, 20) to which there is secured, as by slots and a screw 163, a depending arm 164 carrying a fitting 165 provided with a cam follower roller 166.

The cam is shown in FIGS. 8, 22 and 23. It is generally designated by the numeral 170 but consists of a plurality of cam segments 171 of equal angular extent and each of which represents one transverse tile row space on the board. The segments 171 are selected to correspond with the longitudinal spacing pattern desired on the board for one type of tiles assembled at a station, and the selected segments are secured, as by cap bolts 172, to a cam plate 173. The cam plate is secured, as by hand clamp screws 174 through arcuate slots 175 in the plate 173, for angular adjustment to the chain driven sprocket 66 of shaft 67 previously described.

A low cam segment 171a controls the arm 148 to interpose the abutment 147 beneath the clutch pin 146 so that no tiles are fed to the board for one transverse row. A high cam segment 171b or a riser cam segment 171c will hold the abutment away from the pin 146 and cause tiles to be fed for the transverse row or rows.

The cam arrangement illustrated in FIG. 8 is for the first station or A1 assembly unit and applies tiles T1 in twos, as shown in FIG. 3, with a single space between pairs. The transverse setting is for the even longitudinal rows 2, 4, 6, etc. It is seen that there are twenty-four segments to take account of the twenty-four transverse rows. The open space on the other side of the cam plate represents the spacing between boards traveling along on the chains.

As seen in FIG. 22, an annular ring 176 fitting in grooves in the cam plate or disk 173 and in the cam segments 171 holds the segments in accurate radial position.

Means are provided for guiding the tiles as ejected or dispensed from the stacks down into the pockets of the boards. As shown in FIGS. 7, 9, 10 and 13, a pair of transverse shafts 180 and 181 are secured between side supports 182 carried on pivots 183 of support plates 184 secured to the mounting plate 94.

To the shaft 180 there are secured flanged sleeves 180a which carry spaced downwardly and inwardly inclined guide plates 185, 186 and between them a swingable striker abutment 187 which is engaged by a tile when ejected forwardly to stop it correctly to drop down into a pocket.

The shaft 181 has mounted thereon a plurality of curved drag fingers 190 which ride on the tops of the inserted tiles to push them down into their pockets if they should be riding up on a partition fin on one side. A locking stop set screw 191 carried by each finger abuts a plate 192 secured between the guide plates 185, 186 to limit the lower position of the finger so it will not touch the top surface of a tile if it lies down in proper position.

The whole assembly on shafts 180, 181 can be swung up about the pivots 183 to gain access to the space below.

Means are provided for cleaning the assembled tiles on the boards at each station and settling the tiles properly in their pockets. The cleaning means here provided (FIGS. 7 and 8), comprising a stiff-bristled brush 195 mounted on a shaft 196 carried in bearings 197 supported on angle brackets 198 slidably carried by mounting members 199 secured to the sides of the frame by bolts 200. The brackets 198 slide up and down between vertical guides 201 provided on the members 199 and the brackets have slots 202 for vertical adjustment. Screws 203 through the slots clamp the brackets in desired adjusted position.

The shaft 196 is provided with a sprocket 204 driven by a chain 205 from a sprocket 206 secured on the constantly turning shaft 63.

Means are provided for preventing operation of the tile feed shaft 137 when a board or tray is not present at the tile feeding position to receive tiles. The means here shown comprises a roller 210 located opposite the feed position to bear on the side of a board or tray. The roller is turnably mounted on a shaft 211 carried by a bar 212 secured rigidly on the end of a clutch operating lever 213 pivoted on a pin 214 of a bracket 215 secured in position by cap bolts 216. A spring 217 urges the roller 210 toward a board. The other end of the lever 212 carries the arm 150 having the clutch pin abutment 149 previously referred to for operating the stop pin 146 of the clutch 145.

The operation of the apparatus will be apparent from the above description. Pattern boards 30 are placed on the chains at the left end; proceed from station to station in continuous movement; and have different types of tiles introduced at each station until the tiles deposited at all stations form a mosaic completely filling the boards. Specifically here, the unit A1 deposits sixteen tiles T1 in each even numbered longitudinal row, starting with the first and second transverse rows, skipping the third transverse row, depositing another pair together and so on. The second unit A2 deposits eight tiles T2 in each even numbered longitudinal row, filling up the single spaces left unfilled by unit A1. The third unit has its feeding and filling mechanism shifted over to deposit twelve tiles T3 in the odd numbered longitudinal rows, starting with one tile in the first transverse row, skipping three, depositing three, and so on with a pair deposited in the last two rows. The fourth unit A4 also has its feeding and filling mechanism shifted over to deposit twelve tiles T4 in the odd numbered longitudinal rows, starting with three in the second, third, and fourth transverse rows, skipping three, and continuing by threes until all spaces have been filled.

The cam segments 171 are readily changeable to take care of the exemplary arrangement described or any other arrangement which may be desired.

The bars 80 assure that the boards moving to a unit are down in position and that there are no parts projecting above the boards.

The mechanism at the depositing position assures that the tiles will be fed out and deposited properly in the pockets of the boards as they pass in continuous movement.

The provision of the removable frame holding all of the magazines for a station unit assures almost continuous operation with practically no time lost for changing tile-charged magazines. The provision for changing magazines on a frame assures quick replacement with any desired type of tiles.

It is thus seen that the invention provides improved means for insuring movement of only cleared trays to the feeding stations; for arranging cams for selective feeding to transverse rows; for shifting the tile supply and feeding mechanism between groups of longitudinal rows; for feeding down tiles into pockets in the boards; and for quickly changing the tile supply magazines.

While an exemplary embodiment of the invention has been described for purposes of illustration, it is to be understood that there may be various embodiments and modifications within the general scope of the invention.

I claim:

1. Tile assembling apparatus for forming selectable mosaic patterns of a plurality of types of tile in the pockets of a partitioned board having a plurality of longitudinal and a plurality of transverse rows of tile receiving pockets, comprising in combination, guiding conveyor means for moving partitioned tile boards along continuously in a lineal direction parallel to the longitudinal rows of pockets, a plurality of tile supplying and feeding units located at longitudinally spaced stations along the path of movement of said continuously moving boards, the tile supply and feeding unit at one of said stations being arranged to supply tiles to one group of alternate longitudinal rows on a board, and the tile supply and feeding unit at another one of said stations being arranged to supply tiles to the other group of alternate longitudinal rows on a board, each of said units including mounting means providing lateral shift to supply tiles to either alternate group of longitudinal rows on a board without changing the lineal travel of the board on the conveyor.

2. Tile assembling apparatus as set forth in claim 1, further characterized by the fact that said tile supply and feeding units each includes a tile stack holder and a plunger for all rows supplied, said stack holders and plungers all being mounted on a common shiftable base, a drive shaft supported in a fixed lateral position for operating all of said plungers, and a laterally shiftable connection between said plungers and said drive shaft.

3. Tile assembling apparatus comprising in combination, means for moving a partitioned tile receiving board along a fixed level way, a tile supply and feeding unit along said way, a bar located ahead of said unit at a height near the normal top level of the board which is adapted to be engaged by the board or any object carried thereon which is disposed at a level above the normal level of the board, and means responsive to movement of said bar when engaged by a moving part for giving a signal.

4. Tile assembling apparatus as set forth in claim 3, wherein said bar is mounted on pivoted arms to swing forward and operate a switch when engaged by a moving part.

5. Tile assembling apparatus comprising in combination, means for moving a pocket bearing partitioned tile receiving board continuously along a way, means for holding a stack of tiles above said board, means, including a power actuated pusher member movable parallel to and in the direction of travel of said tile receiving board, for feeding out a tile from said stack to fall down in a pocket on said tray, and a swingable strike plate member disposed in front of a tile when fed out for stopping it and assisting it to fall squarely in a pocket of said board.

6. Tile assembling apparatus as set forth in claim 5, further characterized by the fact that said swingable strike plate member is mounted on a hinged support so as to be swingable away from the tile feeding position.

7. Tile assembling apparatus for forming selectable mosaic patterns of a plurality of types of tiles in the pockets of a partitioned board having a plurality of longitudinal rows and a plurality of transverse rows of tile receiving pockets, comprising in combination, means for moving tile boards along to receive tiles, means for feeding tiles to a plurality of rows of a board from magazines, and a removable frame carrying a plurality of tile holding magazines fitting retaining means at said tile feeding means for supplying tiles from said magazines to said tile feeding means.

8. Tile assembling apparatus as set forth in claim 7, in which said removable frame comprises means for removably holding separate magazines thereon.

9. Tile assembling apparatus comprising in combination, tile supply means for supplying tiles to a plurality of rows, a plurality of plungers for feeding tiles to a plurality of rows simultaneously, a laterally shiftable support carrying said tile supply means and also carrying support and guide means for said plungers, a common drive member, means separately connecting each of said plungers to said drive member, a drive device for said drive member, and means separably connecting said drive member to said drive means, said separable connections providing for the removal of a single plunger or all plungers together from the apparatus.

10. Apparatus as set forth in claim 9, in which said separable connections for said drive member to said drive means also provides for laterally shiftable connections to match the laterally shiftable positions of said laterally shiftable support.

11. Tile assembling apparatus for forming selectable mosaic patterns of a plurality of types of tiles in the pockets of a partitioned board having a plurality of longitudinal rows and a plurality of transverse rows of tile receiving pockets, comprising in combination, guiding conveyor means for moving partitioned tile boards along continuously in a lineal direction parallel to the longitudinal rows of pockets, a plurality of tile supplying and feeding units located at longitudinally spaced stations along the path of movement of said continuously moving boards, the tile supply and feed unit at one of said stations being arranged to supply tiles to one group of alternate longitudinal rows on a board, and the tile supply and feeding unit at another one of said stations being arranged to supply tiles to the other group of alternate longitudinal rows on a board, all of said units together supplying tiles to all of the pockets of all rows, each tile supply and feed unit comprising tile supply means for all longitudinal rows supplied by said unit, power operated pusher bars for feeding tiles for each row from said supply means, a common power shaft for operating all of said pusher bars, drive means for said power shaft timed in action with the travel of said conveyor means and tile-receiving boards thereon for moving said pusher bars to feed a tile for each transverse row of pockets which passes the feeding position, a one-revolution clutch for said power shaft, a cam shaft timed in operation with said conveyor means to make one revolution for each board which passes said tile supply and feed unit, a cam disk carried by said cam shaft having replaceable cam elements for controlling the operation of said clutch, each cam element controlling the clutch action for each transverse row of board pockets, said cam disk also having cam elements for controlling said clutch to prevent the operation of said power shaft and pusher bars for the spacing between boards on said conveyor means, and means responsive to the presence or absence of a board in the proper position on said conveyor means for operating said clutch to prevent the operation of said power shaft and pusher bars during the passage of a board-holding length of a conveyor when a board is not in position thereon.

12. Tile assembling apparatus as set forth in claim 11, in which said power shaft and its clutch with drive and control means are fixed in position relative to said conveyor means, said tile feed means including mounting means providing lateral shift in position relative to said conveyor means for feeding either alternate group of longitudinal rows, mounting means for said pusher bars movable with said tile feed means, and axially shiftable drive connecting means between said power shaft and said pusher bars providing for drive of said pusher bars by said power shaft in either laterally shifted position.

References Cited by the Examiner
UNITED STATES PATENTS

| | | | |
|---|---|---|---|
| 1,315,166 | 9/19 | Semashko | 29—211 |
| 1,447,155 | 2/23 | Semashko | 29—211 |
| 3,033,739 | 5/62 | Klein | 156—561 |

WHITMORE A. WILTZ, *Primary Examiner.*

THOMAS H. EAGER, *Examiner.*